United States Patent [19]

Asrar

[11] Patent Number: 5,399,429
[45] Date of Patent: Mar. 21, 1995

[54] FLAME RETARDANT RECYCLED POLYESTER COPOLYMERS

[75] Inventor: Jawed Asrar, Chesterfield, Mo.

[73] Assignee: Monsanto Company, St. Louis, Mo.

[21] Appl. No.: 209,937

[22] Filed: Mar. 11, 1994

[51] Int. Cl.$^6$ .................... D02G 3/00; C08G 63/692; C08G 79/02

[52] U.S. Cl. .................... 428/364; 528/272; 528/274; 528/287; 528/298; 528/302; 528/308; 525/437; 525/444

[58] Field of Search ............... 528/272, 274, 287, 298, 528/302, 308; 525/437, 444; 428/364

[56] References Cited

U.S. PATENT DOCUMENTS

| | | | |
|---|---|---|---|
| Re. 30,783 | 10/1981 | Kleiner et al. | 528/287 |
| 3,641,112 | 2/1972 | Ichikawa et al. | 560/93 |
| 3,874,157 | 4/1975 | Knopka | 57/255 |
| 3,922,323 | 11/1975 | Reese et al. | 558/77 |
| 3,941,752 | 3/1976 | Kleiner et al. | 528/287 |
| 3,969,437 | 7/1976 | Shim | 558/83 |
| 4,014,858 | 3/1977 | Chipman et al. | 528/283 |
| 4,022,826 | 5/1977 | Lohmar et al. | 562/817 |
| 4,034,141 | 7/1977 | Duffy et al. | 428/473 |
| 4,059,546 | 11/1977 | Knopka | 524/34 |
| 4,081,463 | 3/1978 | Birum et al. | 562/24 |
| 4,096,202 | 6/1978 | Farnham et al. | 525/64 |
| 4,101,528 | 7/1978 | Knopka | 524/409 |
| 4,204,070 | 5/1980 | Suzuki et al. | 560/94 |
| 4,365,054 | 12/1982 | Stabley, Jr. | 528/277 |
| 4,440,924 | 4/1984 | Kuze et al. | 528/275 |
| 4,501,878 | 2/1985 | Adams | 528/286 |
| 4,656,241 | 4/1987 | Iida et al. | 528/279 |
| 4,745,211 | 5/1988 | Jackson et al. | 560/80 |
| 4,959,450 | 9/1990 | Morris et al. | 528/272 |
| 4,970,286 | 11/1990 | Genz et al. | 528/193 |
| 4,983,707 | 1/1991 | Tanisake et al. | 528/193 |
| 4,983,777 | 1/1991 | Van Sickle | 568/568 |
| 4,985,501 | 1/1991 | Udipi | 525/173 |
| 5,011,877 | 4/1991 | Morris et al. | 524/115 |
| 5,011,878 | 4/1991 | Morris et al. | 524/115 |
| 5,116,938 | 5/1992 | Engel-Bader et al. | 528/272 |

FOREIGN PATENT DOCUMENTS

| | | |
|---|---|---|
| 0510591A2 | 10/1992 | European Pat. Off. . |
| 55-718 | 1/1980 | Japan . |
| 9302122 | 2/1993 | WIPO . |

*Primary Examiner*—Samuel A. Acquah
*Attorney, Agent, or Firm*—Lawrence L. Limpus

[57] ABSTRACT

A flame retardant linear polyester comprising the product of recycled polyethylene terephthalate, bis-hydroxy alkyl bibenzoate and a flame-retarding amount of a carboxy-phosphinic acid, a process for producing the polyester and products produced from the polyester are disclosed.

45 Claims, No Drawings

FLAME RETARDANT RECYCLED POLYESTER COPOLYMERS

BACKGROUND OF THE INVENTION

This invention relates to new flame retardant polyester compositions. More particularly, this invention relates to new flame retardant copolyesters produced from recycled polyesters and to a method for producing the copolyester compositions. More particularly this invention relates to new flame retardant copolyesters produced from recycled polyethylene terephthalate, another dicarboxylate moiety and carboxy-phosphinic acids, a process for producing the copolyesters and shaped articles produced from the copolyesters.

DESCRIPTION OF THE PRIOR ART

One of the major uses of polyethylene terephthalate is the production of bottles for milk and soft drinks and several billion bottles are produced for these uses each year. In recent years the environment has received greater attention and organized efforts have appeared to promote the recycling of many materials including the bottles made of polyethylene terephthalate to remove them from the growing volume of solid waste. Recycled polyethylene terephthalate can be processed into lower grade polyester products; however, the properties of recycled polyethylene terephthalate such as, for example, the glass transition temperature have generally been inferior when compared to the properties of virgin polyethylene terephthalate because the intrinsic viscosity is lower. Recycled polyethylene terephthalate has, thus, generally not been used for the production of products such as bottles or fibers where these properties are relatively critical. Instead the recycled polyethylene terephthalate, like other recycled plastic, has been used to produce products with less demanding requirements such as, for example, fibers for pillows, building materials such as plastic lumber and dividers for parking lots.

One of the major uses of polyesters is the production of shaped polyester articles and of woven and non-woven textiles such as fabrics, filaments, staples or yarn and of sheets. In recent years efforts to make textiles less flammable, to improve the safety characteristics of products such as apparel, bedding, home furnishings, aircraft and automobile interior fabrics and industrial fabrics, have increased. It is also recognized that the textiles may be blends, particularly blends of natural fibers, such as cotton, and synthetic fibers, such as polyesters.

There are various methods known for flame retarding textiles. U.S. Pat. No. 4,034,141 teaches the use of brominated phosphoramidates to treat combustible materials such as cotton and synthetic fibers to impart fire retardant properties. The fire retardant composition is applied by treating the fabric with a solution of the composition, drying the fabric and curing the composition.

U.S. Pat. No. 3,969,437 teaches the use of a specific class of cyclic phosphorus esters to prepare a durable, flame retardant textile finish for cotton-polyester blends. The phosphorus ester used must contain at least one carbon-bonded primary alcohol group, and preferably two or more, plus a pentavalent phosphorus ester group.

Surface treatment to impart flame retardant characteristics, and even the admixture of flame retardant compounds into hardenable shaped compositions, has disadvantages. Surface treatments may be removed by cleaning and admixed compounds may exude or migrate from the product. Therefore, attempts have been made to overcome these disadvantages by chemically building flame retardant compounds into the polyester.

U.S. Pat. No. 3,922,323 teaches a process for improving the flame resistance of polyesters, especially unsaturated polyesters, by chemically binding and/or admixing organic phosphorus compounds and, if desired, halogen compounds into the polyesters. Halogen containing, at least bicyclic phosphonic esters which are free from hydroxy and carboxylic groups are used.

U.S. Pat. No. 3,941,752 teaches a flame retarded, synthetic linear polyester modified with carboxy-phosphinic acids. The linear polyester is the polycondensation product of a dicarboxylic acid, a diol and a flame-retarding carboxy-phosphinic acid monomer which may contain hetero atoms.

A need remains for flame retardant polyester materials which will maintain their flame retardant properties throughout their useful life and for a process to produce such a polyester. In addition, as the environment has received greater attention, the need for a high value use for recycled polyester materials has grown.

SUMMARY OF THE INVENTION

It is an object of this invention to provide a flame retardant polyester material, a process to produce the polyester material and shaped articles produced from the polyester.

It is another object of this invention to provide a flame retardant copolyester composition, produced from recycled polyester, in which the flame retardant material is chemically bound within the polymer structure.

It is yet another object of this invention to provide a flame retardant copolyester composition, produced from recycled polyester, having properties equal to or better than the properties of virgin polyethylene terephthalate.

These and other objects are met by this invention which is directed to copolyesters of a recycled polyester, a bis-hydroxy alkyl dicarboxylate and a carboxy-phosphinic acid monomer which have a flame retardant property and which have an intrinsic viscosity greater than about 0.6, and preferably within a range of from about 0.6 to about 1.2, and a glass transition temperature greater than about 65° C. The recycled polyester is preferably polyethylene terephthalate, the bis-hydroxy alkyl dicarboxylate is preferably bis-$\beta$-hydroxy ethyl bibenzoate or bis-$\beta$-hydroxy ethyl naphthanate and the carboxy-phosphinic acid monomer is preferably 2-carboxyethyl(phenyl) phosphinic acid, or the cyclic anhydride thereof. The bibenzoate, or the naphthanate, is copolymerized along with the carboxy-phosphinic acid and recycled polyethylene terephthalate. The copolyester is preferably a polyethylene dicarboxylate copolyester having from 0% to about 99.9% by weight of recycled polyethylene terephthalate, from 0% to about 99.9% by weight of bis-hydroxy alkyl bibenzoate and from about 0.1% to about 10% by weight of the carboxy-phosphinic acid monomer. The copolyester is produced by placing the desired amounts of recycled polyethylene terephthalate, hydroxy alkyl bibenzoate and carboxy-phosphinic acid in a nitrogen filled reactor in the presence of a catalyst which is preferably based upon antimony such as, for example, antimony oxide.

The reactor is heated to a temperature within the range of from about 250° C. to about 293° C., and preferably within a range of from about 263° C. to about 293° C. for a period of about 3 hours. A vacuum is applied slowly to reduce the pressure to a pressure within the range of from about 0.5 to about 1.0 mm of mercury.

In addition to copolyesters of polyethylene terephthalate, the invention also includes copolyesters of other polyalkylene dicarboxylates such as polybutylene terephthalate and polyethylene naphthanate.

DESCRIPTION OF THE PREFERRED EMBODIMENTS

The present invention relates to copolyesters of recycled polyesters having flame retardant properties. The copolyesters of this invention have an intrinsic viscosity greater than about 0.6, and preferably within the range of from about 0.6 to about 1.2. The copolyesters of recycled polyethylene terephthalate are preferably a polyethylene dicarboxylate copolyester having from 0% to about 99.9% by weight recycled polyethylene terephthalate, from 0% to about 99.9% by weight of another dicarboxylate moiety, which is preferably a bis-hydroxy alkyl bibenzoate and more preferably bis-β-hydroxy ethyl bibenzoate, and from about 0.1% to about 10% by weight of a flame retarding carboxyphosphinic acid monomer having the general formula:

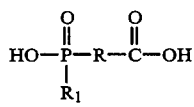

wherein R is a saturated open-chain or cyclic alkylene radical having from one to about 15 carbon atoms, preferably from 2 to about 10 carbon atoms, or an arylene or aralkylene radical having from 1 to about 15 carbon atoms such as, for example, methyl, ethyl, propyl, isopropyl, pentyl, neopentyl, hexyl, cyclohexyl, octyl, 2-ethylhexyl, iso-octyl, decyl, isodecyl, dodecyl, tetradecyl, —$C_6H_4$—, —$C_6H_4$—$CH_2$—, and —$C_6H_4$—$CH_2$—$CH_2$—, and $R^1$ is an alkyl radical having up to about 6 carbon atoms, an aryl radical or an alkaryl radical wherein the alkyl substituent has from 1 to about 6 carbon atoms such as, for example, methyl, ethyl and n- and i-propyl. The carboxy-phosphinic acid is preferably 2-carboxyethyl(phenyl) phosphinic acid, 2-carboxyethyl(methyl) phosphinic acid, the cyclic anhydride of 2-carboxyethyl(phenyl) phosphinic acid or the cyclic anhydride of 2-carboxyethyl(methyl) phosphinic acid.

Polymerization of 90% by weight recycled polyethylene terephthalate and 10% by weight 2-carboxyethyl(phenyl)phosphinic acid produced a flame retardant polyester having an intrinsic viscosity of about 0.70. The polyester, however, had a slight drop in the glass transition temperature, the melting point and the crystallinity when compared to virgin polyethylene terephthalate, but the color of the polyester was improved. The glass transition temperature, melting point and crystallinity of the polyester produced from recycled polyethylene terephthalate is improved by the addition of another dicarboxylate moiety in accordance with this invention.

While recycled polyethylene terephthalate is the preferred recycled polyester, other polyalkylene terephthalates such as, for example, polybutylene terephthalate can be used. Other polyalkylene dicarboxylates such as, for example polyethylene or polybutylene naphthanate can also be used.

The dicarboxylate moiety can be produced from any dicarboxylic acid except unsubstituted terephthalic acid. Thus the dicarboxylate moiety can be produced from an aliphatic group having from 2 to about 12 carbon atoms, from substituted or unsubstituted isophthalic acid, from the substituted or unsubstituted dicarboxylic acids of biphenyls, naphthalene, terphenyls and other polyaromatics such as, for example, diphenyl ether, and from substituted terephthalic acid. When a dicarboxylic acid other than unsubstituted terephthalic acid is reacted with recycled polyethylene terephthalate, the copolyesters of this invention are produced. If, for example, a polyester having a high glass transition temperature or other good high temperature properties is desired, then the dicarboxylate moiety is preferably an aromatic bis-hydroxy alkyl dicarboxylate. The dicarboxylate moiety is a hydroxy ethyl dicarboxylate compound or other hydroxy alkyl dicarboxylate compound having the general formula:

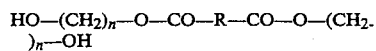

where each n is independently a number between 1 and 8, R is selected from the group consisting of aliphatic groups having from 2 to about 12 carbon atoms; substituted benzene wherein the substituent is a halogen, an alkyl group having a carbon chain of from 1 to about 8 carbon atoms, or a substituted or unsubstituted phenyl group; naphthyl and substituted naphthyl wherein the substituent is hydrogen, halogen, an alkyl group having a carbon chain having from 1 to about 8 carbon atoms, or phenyl and substituted phenyl; and a moiety having the general formula:

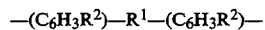

wherein $R^1$ is selected from the group consisting of nil, oxygen, phenyl and substituted phenyl, an alkyl group having a carbon chain of from 1 to about 8 carbon atoms, and —HC=CH—; and wherein each $R^2$ is independently selected from the group consisting of hydrogen, halogen, an alkyl group having a carbon chain having from 1 to about 8 carbon atoms, phenyl and substituted phenyl. More specifically the dicarboxylate moiety is preferably produced from bis-β-hydroxy ethyl bibenzoate.

While the dicarboxylate moiety is preferably a hydroxy ethyl dicarboxylate compound, it is recognized that other hydroxy alkyl groups may be used and it is preferred that each of the alkyl groups be independently selected from the group consisting of alkyl radicals having from 1 to 8 carbon atoms such as, for example, methyl, propyl, isopropyl, butyl, hexyl, 2-ethylbutyl, octyl and 2-ethylhexyl groups.

The preferred dicarboxylate monomer is bis-β-hydroxy ethyl bibenzoate; however, the biphenyl moiety is not required. As shown above, the copolyesters of this invention may be produced equally well from a naphthanate or another dicarboxylate such as, for example, bis-hydroxy ethyl naphthanate, bis-hydroxy ethyl isophthalate, and bis-hydroxy ethyl diphenyl ether. Although these examples are of dicarboxylates having bis-hydroxy ethyl groups, other hydroxy alkyls such as, for example, bis-hydroxy butyl, bis-hydroxy hexyl and bis-hydroxy octyl groups can be used.

The dicarboxylate moieties used in the process have structures which will strengthen the polymer and impart rigidity to the polymer backbone. As a result the copolyester will have a higher glass transition temperature and the tensile and flexural properties of the polyester will be improved. In addition the resulting copolyester of recycled polyethylene terephthalate and the dicarboxylic moiety has an increased molecular weight, both weight average molecular weight (Mw) and number average molecular weight (Mn), when compared to the molecular weight of virgin polyethylene terephthalate without the inclusion of the dicarboxylate moiety of this invention. When polyethylene naphthanate or other dicarboxylates are used to produce copolyesters in accordance with this invention, the resulting copolyesters have improved performance characteristics or properties such as, for example, increased intrinsic viscosity and higher glass transition temperature. The improvement in the characteristics of copolyesters produced from naphthanates or other dicarboxylates is similar to the improvement in the characteristics of recycled polyethylene terephthalate when it is used in accordance with this invention.

The lower molecular weight of the polyester produced from recycled polyethylene terephthalate without the inclusion of the dicarboxylate moiety is believed to be caused by chain scission, the breaking of carbon-carbon bonds, during the recycling process. The inclusion of the dicarboxylate moiety and the carboxy-phosphinic acid in the process of this invention promotes chain bonding to produce longer carbon chains and, thus, higher molecular weights. The inclusion of the dicarboxylic moiety and the carboxy phosphinic acid is a complex process in which the intrinsic viscosity of the process fluid drops originally from the viscosity of the polyethylene terephthalate to as low as about 0.25 before it begins to rise and the intrinsic viscosity of the copolyester may reach as high as about 1.2 if the process is allowed to go to completion.

The flame retarding carboxy-phosphinic acid monomer having the general formula:

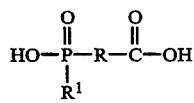

wherein R is a saturated open-chain or cyclic alkylene radical having from one to about 15 carbon atoms, preferably from 2 to about 10 carbon atoms, or an arylene or aralkylene radical having from 1 to about 15 carbon atoms such as, for example, methyl, ethyl, propyl, isopropyl, pentyl, neopentyl, hexyl, cyclohexyl, octyl, 2-ethylhexyl, iso-octyl, decyl, isodecyl, dodecyl, tetradecyl, —$C_6H_4$—, —$C_6H_4$—$CH_2$—, and —$C_6H_4$—$CH_2$—$CH_2$—, and $R^1$ is an alkyl radical having up to about 6 carbon atoms, an aryl radical or an alkaryl radical wherein the alkyl substituent has from 1 to about 6 carbon atoms such as, for example, methyl, ethyl and n- and i-propyl. The carboxy-phosphinic acid is preferably 2-carboxyethyl(phenyl) phosphinic acid, 2-carboxyethyl(methyl) phosphinic acid, the cyclic anhydride of 2-carboxyethyl(phenyl) phosphinic acid or the cyclic anhydride of 2-carboxyethyl(methyl) phosphinic acid.

The preferred acid, 2-carboxyethyl (phenyl)phosphinic acid, may be prepared in accordance with the teaching in U.S. Pat. No. 4,081,463. The 2-carboxyethyl(phenyl)phosphinic acid is prepared in two stages by first reacting dichloro(phenyl)phosphine with acrylic acid employed at a molar excess of 25% to 45% to form a mixture of three intermediates, 3-(chlorophenylphosphinyl) propionyl chloride, the cyclic anhydride of 2-carboxyethyl(phenyl)phosphinic acid and the mixed anhydride of acrylic acid with 3-chlorocarbonylethyl(phenyl)phosphinic acid. The second stage of the process is the hydrolysis of the of the mixture of the three intermediates to obtain the desired product, 2-carboxyethyl(phenyl)phosphinic acid.

The flame retardant copolyesters of recycled polyethylene terephthalate are preferably polyethylene dicarboxylate copolyesters having from about 99.9% to 0% by weight recycled polyethylene terephthalate, from 0% to about 99.9% by weight of another dicarboxylate moiety and from about 0.1% to about 10% of the flame retarding 2-carboxyethyl(phenyl)phosphinic acid, or the cyclic anhydride thereof. The properties desired in the copolyester products will determine the amount of the other dicarboxylate moiety included in the copolyester.

While the desired polyester of this invention may be produced by the polymerization of from about 99.9% to about 90% by weight recycled polyethylene terephthalate and from about 0.1% to about 10% by weight of 2-carboxyethyl(phenyl) phosphinic acid, the properties of the polyester can be improved by the addition of a hydroxy ethyl bibenzoate, preferably bis-β-hydroxy ethyl bibenzoate, to the polymerization to produce a copolyester. As the bis-β-hydroxy ethyl bibenzoate content increased, the flame retarding properties of the carboxy-phosphinic acid were surprisingly enhanced, the glass transition temperature of the copolyester increased and the crystallinity improved. The expected decrease in reactivity during the polymerization reaction, resulting from the addition of the phosphinic acid rather than another carbonyl acid group, was not observed. The high molecular weight of the product polyester indicated that the phosphinic acid group was highly reactive and the end group analysis did not show terminal phosphinic acid groups in a high proportion. Further, the addition of phosphorus compounds usually creates additional observable color in the product. Surprisingly, the addition of the carboxy-phosphinic acid in this invention allowed the use of higher amounts of catalyst and still had less color in the product than polyesters produced without the included acid.

Copolyesters of recycled polyethylene terephthalate having from about 0.1% to about 20% of another dicarboxylate moiety, such as a bibenzoate or naphthanate, produce a polyester that has a low melting point (Tm), low crystallinity and a low rate of crystallization. However these copolyesters have a higher glass transition temperature and better stability against ultraviolet light than polyethylene terephthalate. These polyesters would be particularly suited for use in the production of biaxially oriented films or other similar products.

Copolyesters of recycled polyethylene terephthalate having from about 20% to about 45% of another dicarboxylate moiety, such as a bibenzoate or naphthanate, produce an amorphous polyester that does not have a melting point. These polyesters would be particularly suited for use as a substitute for high temperature, amorphous polyethylene terephthalate.

Copolyesters of recycled polyethylene terephthalate having greater than about 45%, and preferably from about 45% to about 90%, of another dicarboxylate moiety, such as a bibenzoate, produce a polyester that has a high melting point (Tm) and higher crystallinity when compared to polyethylene terephthalate prepared at the same conditions. These polyesters would be particularly suited for use as high performance engineering plastics.

A large portion of the production of polyethylene terephthalate is based upon the melt polymerization of terephthalic acid and ethylene glycol. The melt polymerization process produces polyethylene terephthalate having an inherent viscosity of about 0.6 and it is necessary to use solid state polymerization in addition to the melt polymerization to raise the inherent viscosity of the polyethylene terephthalate to the range of 0.9 to 1.2 that is needed for the production of many products.

The addition of a few percent of another dicarboxylate moiety in the form of, for example, bis-β-hydroxy ethyl bibenzoate to recycled polyethylene terephthalate raises the glass transition temperature of the resulting polyethylene terephthalate copolyester. In addition, it significantly improves the polymerization process to produce copolymers of the recycled polyethylene terephthalate having an inherent viscosity greater than 0.6 and preferably within the range of 0.6 to about 1.2 without the previously required, and expensive, solid state polymerization steps. It is possible to produce copolymers of recycled polyethylene terephthalate and another dicarboxylate wherein the copolyesters have about 99.9% by weight recycled polyethylene terephthalate and wherein the copolyesters have about 99.9% by weight of the other dicarboxylate moiety.

The properties of the copolyesters of polyethylene terephthalate are dependent upon the amount of the other dicarboxylate moiety included in the copolyester. Copolyesters having from about 99.9% to about 80% by weight polyethylene terephthalate and from about 0.1% to about 20% by weight of another dicarboxylate moiety have a low melting point, low crystallinity and a higher glass transition temperature. Copolyesters having from about 80% to about 55% by weight polyethylene terephthalate and from about 20% to about 45% by weight of another dicarboxylate moiety are amorphous. Copolyesters having from about 55% to about 10% by weight polyethylene terephthalate and from about 45% to about 90% by weight of another dicarboxylate moiety have a high melting point, high crystallinity and a higher glass transition temperature.

The copolyesters were produced by placing the desired amounts of polyethylene terephthalate, bis-β-hydroxy ethyl bibenzoate and 2-carboxyethyl(phenyl)-phosphinic acid in a nitrogen filled reactor in the presence of a catalyst which is preferably antimony oxide. The reactor was heated to a temperature within a range of from about 250° C. to about 293° C., and preferably within a range of from about 263° C. to about 293° C., for about 3 hours. A vacuum was applied slowly to reduce the pressure to a pressure of from about 0.5 to about 1.0 mm of mercury. The reaction was continued at those conditions for an additional 0.5 to 1.5 hours and the heat and vacuum were then removed.

The copolyesters and processes have been described above using polyethylene terephthalate and the preferred hydroxy ethyl dicarboxylate moiety. However, the copolyesters can also be produced by using ethylene glycol and the appropriate diacid in the process with the polyethylene terephthalate. Thus ethylene glycol and biphenyl dicarboxylic acid may be used in the process to replace bis-β-hydroxy ethyl bibenzoate, Similarly, ethylene glycol and naphthalene dicarboxylic acid may be used.

Ethylene glycol was used in the above description of the process and it is the preferred diol. However, other aliphatic diols such as, for example, aliphatic diols having from 3 to about 7 carbon atoms, may also be used.

The carboxy-phosphinic acid and its cyclic anhydride are not volatile under the process conditions for production of the polyesters so they can be incorporated in the polyester by inclusion in the condensation reaction. When incorporated into the molecule during the condensation reaction the phosphorus containing structural unit is randomly distributed in the linear polyester product.

The polyesters of this invention may be made into shaped articles. They may be spun into filaments and fibers using well known processes and the standard additional treatments. The polyesters may also be extruded into sheets or formed into shaped articles which may be solid or hollow by press molding, injection molding and extrusion. All of these shaped articles (fibers, sheets and other shapes) are also an object of this invention.

The fibers and filaments have very good and permanent flame retardant and self-extinguishing properties. Since they have a good degree of whiteness, they have very good dyeing properties for disperse dyestuffs and their receptivity includes acid dyestuffs in color shades of average to deep intensity. The tensile strength of the filaments and fibers, second order transition temperature and melting point approximately correspond to the values for polyesters which do not contain the flame retardant carboxy-phosphinic acid. The fibers and filaments are generally useful for applications where readily ignitible textiles cannot be tolerated and it is possible to use these fibers in combination with natural fibers, such as cotton, and other synthetic fibers.

Sheets and shaped articles produced from the flame retardant polyester are generally used in locations where it is desired to reduce the possible serious risks if ignition and a fire occur. If the transparency of the shaped articles is not of concern, their solidity and flame retarding properties can be enhanced by the inclusion of inorganic fiber materials such as, for example, glass and quartz fibers and carbon in the usual quantities, in the polyester before molding.

This invention will be explained in detail in accordance with the examples below, which are for illustrative purposes only and shall not limit the present invention. The ratio of the reactants and properties of the resulting copolymers are shown in the Table below.

EXAMPLES 1-4

After the label was removed, a polyethylene terephthalate bottle, such as those which contain soft drinks, was washed with detergent and water, cut into pieces and dried at a temperature of about 60° C. for 7 hours in a vacuum oven. A mixture of 16 grams of recycled bottle polyethylene terephthalate (PET), 2 grams of bis-β-hydroxy ethyl bibenzoate (HEB), 2 grams of 2-carboxyethyl(phenyl) phosphinic acid (CPA), 3.2 grams of ethylene glycol (EG), and 0.004 grams of antimony oxide was placed within a 50 milliliter flask with a stainless steel stirrer. The flask had a nitrogen inlet and outlet and a provision for pulling a vacuum. The flask was evacuated and filled with nitrogen 3 times at room temperature and then a continuous, slow flow of nitrogen was maintained through the flask.

The flask was placed in a salt bath which had been preheated to about 250° C. The temperature of the salt bath was raised from 250° C. to about 285° C. over a period of 1 hour and ethylene glycol was distilled off. The pressure was then reduced to 150 millitorr over a period of about 1 hour. The pressure in the flask was further reduced to about 50 millitorr over a period of about 30 minutes and the reaction was continued at these conditions for an additional 45 minutes at which time the heat and vacuum were removed. The resulting copolymer had an intrinsic viscosity of 0.79 at a concentration of 0.5 grams/deciliter in a solution of 60% phenol/40% tetrachloroethane at 25° C. The glass transition temperature was determined to be 70° C. by differential scanning calorimeter. This example is shown as Example 4 in the Table below.

The reaction of this Example was repeated 4 times and the ratio between the reactants, the ratio of the recycled polyethylene terephthalate to the bis-β-hydroxy ethyl bibenzoate and carboxy-phosphinic acid was varied in accordance with this invention. As a reference or control, the reaction was repeated with only polyethylene terephthalate and with polyethylene terephthalate and bis-β-hydroxy ethyl bibenzoate. The reaction was also repeated changing the ratio between the polyethylene terephthalate and the bis-β-hydroxy ethyl bibenzoate while maintaining a constant amount of the carboxy-phosphinic acid. Examples 1–4 are shown in the Table below.

EXAMPLE 5

The reaction of Examples 1–4 was modified to illustrate another embodiment of the invention. The bis-β-hydroxy ethyl bibenzoate was replaced by biphenyl dicarboxylic acid and ethylene glycol. In this reaction, 16 grams of recycled polyethylene terephthalate (PET), 2 grams of 4,4'-biphenyl dicarboxylic acid (BDA), 2 grams of 2-carboxyethyl(phenyl) phosphinic acid (CPA) and 3.5 grams of ethylene glycol (EG) were reacted in the presence of 0.004 grams of antimony oxide. The conditions of the reaction were as set forth in Examples 1–4 above. The resulting copolymer had an intrinsic viscosity of 0.77 at a concentration of 0.5 grams/deciliter in a solution of 60% phenol/40% tetrachloroethane at 25° C. The glass transition temperature was determined to be 70° C. by differential scanning calorimeter. Example 5 is shown in the Table below.

EXAMPLE 6

The reaction of Examples 1–4 was modified to illustrate another embodiment of the invention. The bis-β-hydroxy ethyl bibenzoate was replaced by naphthalene dicarboxylic acid and ethylene glycol. In this reaction, 16 grams of recycled polyethylene terephthalate (PET), 2 grams of 2,6-naphthalene dicarboxylic acid (NDA), 2 grams of 2-carboxyethyl(phenyl) phosphinic acid (CPA) and 3.5 grams of ethylene glycol (EG) were reacted in the presence of 0.004 grams of antimony oxide. The conditions of the reaction were as set forth in Examples 1–4 above. The resulting copolymer had an intrinsic viscosity of 0.77 at a concentration of 0.5 grams/deciliter in a solution of 60% phenol/40% tetrachloroethane at 25° C. The glass transition temperature was determined to be 70° C. by differential scanning calorimeter. Example 6 is shown in the Table below.

The following Table shows the results of the reactions described in the Examples above. The Table includes the ratio of the reactants, the amount of the catalyst (antimony oxide) present in the reactor during the reaction and properties of the resulting copolymers. The properties included in the Table are the intrinsic viscosity (I.V.), the molecular weight as weight average molecular weight (Mw) and number average molecular weight (Mn), and the glass transition temperature in degrees Centigrade (Tg). The melting point in degrees Centigrade is also shown for Example 4.

TABLE 1

| EXAMPLE | RATIO PET/HEB/CPA/EG | GRAMS OF CATALYST | Mw/ I.V. | Mn | Tg(°C.)/ MP(°C.) |
|---|---|---|---|---|---|
| 1 (Control) | 20/0/0/0 | — | 0.7 | 4.67/ 11.8 | 82 |
| 2 (Control) | 18/2/0/0 | 0.004 | 1.28 | — | 85 |
| 3 | 16/2/2/3.2 | 0.004 | 0.79 | — | 70 |
| 4 | 2/16/2/0 | 0.004 | 0.64 | — | 91/245 |
| 5 | PET/BDA/CPA/EG 15/2/2/3.5 | 0.004 | 0.70 | — | 70 |
| 6 | PET/NDA/CPA/EG 16/2/2/3.5 | 0.004 | 0.70 | — | 70 |

While certain preferred embodiments of the invention have been illustrated and described herein, it is to be understood that the invention is not limited thereby and that the invention may be variously practiced within the scope of the following claims.

I claim:
1. A flame retardant linear polyester comprising the product of:
 a recycled polyester;
 a hydroxy ethyl dicarboxylate compound having the general formula:

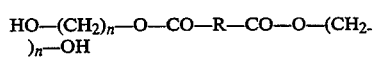

wherein n is a number from 1 to 8 and R is selected from the group consisting of aliphatic groups having from 2 to about 12 carbon atoms; substituted benzene wherein the substituent is a halogen, an alkyl group having a carbon chain of from 1 to about 8 carbon atoms, or a phenyl or substituted phenyl group; naphthyl and substituted naphthyl wherein the substituent is hydrogen, halogen, an alkyl group having a carbon chain of from 1 to about 8 carbon atoms, or phenyl and substituted phenyl; and a moiety having the general formula:

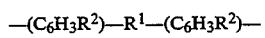

wherein $R^1$ is selected from the group consisting of nil, oxygen, phenyl and substituted phenyl, an alkyl group having a carbon chain of from 1 to about 8 carbon atoms, and —HC=CH— and wherein each $R^2$ is independently selected from the group consisting of hydrogen, halogen, an alkyl group having a carbon chain having from 1 to about 8 carbon atoms, and phenyl and substituted phenyl; a flame retardant amount of a carboxy-phosphinic acid having the general formula:

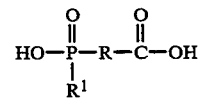

wherein R is selected from the group consisting of saturated open-chain or cyclic alkylene radicals having from one to about 15 carbon atoms, and arylene and aralkylene radicals having from 1 to about 15 carbon atoms and $R^1$ is selected from the group consisting of alkyl radicals having up to about 6 carbon atoms, aryl radicals and alkaryl radical wherein the alkyl substituent has from 1 to about 6 carbon atoms.

2. The flame retardant linear polyester of claim 1 wherein the recycled polyester is selected from the group consisting of polyethylene terephthalate, polybutylene terephthalate and polyethylene naphthanate.

3. The flame retardant linear polyester of claim 2 wherein the recycled polyester is polyethylene terephthalate.

4. The flame retardant linear polyester of claim 2 wherein the recycled polyester is polyethylene naphthanate.

5. A flame retardant linear polyester comprising the product of recycled polyethylene terephthalate, bis-hydroxy alkyl bibenzoate and a flame-retarding carboxy-phosphinic acid monomer, the carboxy-phosphinic acid monomer being present in an amount of from about 0.1% to about 10% by weight based upon the total weight of the polyester.

6. The flame retardant linear polyester of claim 5 wherein the alkyl substituent of the bis-hydroxy alkyl bibenzoate is selected from the group consisting of alkyl radicals having from 1 to 8 carbon atoms.

7. The flame retardant linear polyester of claim 6 wherein the bis-hydroxy alkyl bibenzoate is bis-β-hydroxy ethyl bibenzoate.

8. The flame retardant linear polyester of claim 5 wherein the carboxy-phosphinic acid monomer is selected from the group consisting of 2-carboxyethyl(phenyl)phosphinic acid, 2-carboxyethyl(methyl)phosphinic acid, the cyclic anhydride of 2-carboxyethyl(phenyl)phosphinic acid and the cyclic anhydride of 2-carboxyethyl(methyl)phosphinic acid.

9. The flame retardant linear polyester of claim 8 wherein the carboxy-phosphinic acid monomer is 2-carboxyethyl(phenyl)phosphinic acid.

10. The flame retardant linear polyester of claim 8 wherein the carboxy-phosphinic acid monomer is 2-carboxyethyl(methyl)phosphinic acid.

11. A flame retardant linear polyester comprising the product of recycled polyethylene terephthalate, bis-hydroxy alkyl naphthanate and a flame-retarding carboxy-phosphinic acid monomer, the carboxy-phosphinic acid monomer being present in an amount of from about 0.1% to about 10% by weight based upon the total weight of the polyester.

12. The flame retardant linear polyester of claim 11 wherein the alkyl substituent of the bis-hydroxy alkyl naphthanate is selected from the group consisting of alkyl radicals having from 1 to 8 carbon atoms.

13. The flame retardant linear polyester of claim 12 wherein the bis-hydroxy alkyl naphthanate is bis-β-hydroxy ethyl naphthanate.

14. The flame retardant linear polyester of claim 11 wherein the carboxy-phosphinic acid monomer is selected from the group consisting of 2-carboxyethyl(phenyl)phosphinic acid, 2-carboxyethyl(methyl)phosphinic acid, the cyclic anhydride of 2-carboxyethyl(phenyl)phosphinic acid and the cyclic anhydride of 2-carboxyethyl(methyl)phosphinic acid.

15. The flame retardant linear polyester of claim 14 wherein the carboxy-phosphinic acid monomer is 2-carboxyethyl(phenyl)phosphinic acid.

16. The flame retardant linear polyester of claim 14 wherein the carboxy-phosphinic acid monomer is 2-carboxyethyl(methyl)phosphinic acid.

17. A process for the production of a flame retardant linear polyester comprising condensing a mixture of recycled polyester, bis-hydroxy alkyl bibenzoate and a flame-retarding amount of a carboxy-phosphinic acid monomer in the presence of a catalyst at a temperature between about 250° C. and about 293° C.

18. The process for the production of a flame retardant linear polyester of claim 17 wherein the recycled polyester is selected from the group consisting of polyethylene terephthalate, polybutylene terephthalate and polyethylene naphthanate.

19. The process for the production of a flame retardant linear polyester of claim 18 wherein the recycled polyester is polyethylene terephthalate.

20. The process for the production of a flame retardant linear polyester of claim 17 wherein the alkyl substituent of the bis-hydroxy alkyl bibenzoate is selected from the group consisting of alkyl radicals having from 1 to 8 carbon atoms.

21. The process for the production of a flame retardant linear polyester of claim 20 wherein the bis-hydroxy alkyl bibenzoate is bis-hydroxy ethyl bibenzoate.

22. The process for the production of a flame retardant linear polyester of claim 17 wherein the carboxy-phosphinic acid monomer is selected from the group consisting of 2-carboxyethyl(phenyl) phosphinic acid, 2-carboxyethyl(methyl)phosphinic acid, the cyclic anhydride of 2-carboxyethyl(phenyl) phosphinic acid and the cyclic anhydride of 2-carboxyethyl(methyl)phosphinic acid.

23. The process for the production of a flame retardant linear polyester of claim 17 wherein the carboxy-phosphinic acid monomer is 2-carboxyethyl(phenyl)phosphinic acid.

24. A process for the production of a flame retardant linear polyester comprising condensing a mixture of recycled polyethylene terephthalate, bis-hydroxy alkyl bibenzoate and a flame-retarding carboxy-phosphinic acid monomer, the carboxy-phosphinic acid monomer being present in an amount of from about 0.1% to about 10% by weight based upon the total weight of the polyester, in the presence of a catalyst at a temperature between about 250° C. and about 293° C.

25. The process of claim 24 wherein the alkyl substituent of the bis-hydroxy alkyl bibenzoate is selected from the group consisting of alkyl radicals having from 1 to 8 carbon atoms.

26. The process of claim 25 wherein the bis-hydroxy alkyl bibenzoate is bis-β-hydroxy ethyl bibenzoate.

27. The process of claim 24 wherein the carboxy-phosphinic acid monomer is selected from the group consisting of 2-carboxyethyl(phenyl)phosphinic acid, 2-carboxyethyl(methyl)phosphinic acid, the cyclic anhydride of 2-carboxyethyl(phenyl)phosphinic acid and the cyclic anhydride of 2-carboxyethyl(phenyl)phosphinic acid.

28. The process of claim 27 wherein the carboxy-phosphinic acid monomer is 2-carboxyethyl (phenyl)-phosphinic acid.

29. The process of claim 27 wherein the carboxy-phosphinic acid monomer is 2-carboxyethyl (methyl)-phosphinic acid.

30. A process for the production of a flame retardant linear polyester comprising condensing a mixture of recycled polyester, a dicarboxylic acid, a diol and a flame-retarding amount of a carboxy-phosphinic acid monomer in the presence of a catalyst at a temperature between about 250° C. and about 293° C.

31. The process for the production of a flame retardant linear polyester of claim 30 wherein the dicarboxylic acid is selected from the group consisting of aliphatic dicarboxylic acids having from 2 to about 12 carbon atoms, isophthalic acid, substituted terephthalic acid and the dicarboxylic acids of biphenyls, naphthalene, terphenyls and diphenyl ether.

32. The process for the production of a flame retardant linear polyester of claim 31 wherein the dicarboxylic acid is biphenyl dicarboxylic acid.

33. The process for the production of a flame retardant linear polyester of claim 31 wherein the dicarboxylic acid is naphthalene dicarboxylic acid.

34. The process for the production of a flame retardant linear polyester of claim 31 wherein the diol is selected from the group consisting of aliphatic diols having from 3 to 7 carbon atoms.

35. The process for the production of a flame retardant linear polyester of claim 34 wherein the diol is ethylene glycol.

36. The flame retardant linear polyester of claim 1 in the form of a shaped article.

37. The flame retardant linear polyester of claim 1 in the form of a fiber.

38. A shaped article comprising a flame retardant linear polyester comprising the product of recycled polyester, dicarboxylic acid and a flame-retarding amount of 2-carboxyethyl(phenyl)phosphinic acid.

39. The shaped article of claim 38 wherein the 2-carboxyethyl(phenyl)phosphinic acid is present in an amount of from about 0.1% to about 10% by weight based upon the total weight of the polyester.

40. The shaped article of claim 38 wherein the recycled polyester is selected from the group consisting of polyethylene terephthalate, polybutylene terephthalate and polyethylene naphthanate.

41. The shaped article of claim 40 wherein the recycled polyester is polyethylene terephthalate.

42. The shaped article of claim 38 wherein the dicarboxylic acid is selected from the group consisting of aliphatic diols having from 3 to 7 carbon atoms.

43. The shaped article of claim 42 wherein the dicarboxylic acid is biphenyl dicarboxylic acid.

44. The shaped article of claim 42 wherein the dicarboxylic acid is naphthalene dicarboxylic acid.

45. The shaped article of claim 38 wherein the shaped article is a fiber.

* * * * *